US008555090B2

(12) United States Patent
Hagiwara (10) Patent No.: US 8,555,090 B2
(45) Date of Patent: Oct. 8, 2013

(54) INFORMATION PROCESSING APPARATUS AND METHOD OF CONTROLLING POWER THEREOF

(75) Inventor: Yuichi Hagiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 702 days.

(21) Appl. No.: 12/099,429

(22) Filed: Apr. 8, 2008

(65) Prior Publication Data

US 2008/0250256 A1    Oct. 9, 2008

(30) Foreign Application Priority Data

Apr. 9, 2007 (JP) ................................. 2007-102130

(51) Int. Cl.
*G06F 1/00* (2006.01)
*G06F 1/26* (2006.01)
*G06F 1/32* (2006.01)

(52) U.S. Cl.
USPC ........... 713/300; 713/320; 713/321; 713/322; 713/323

(58) Field of Classification Search
USPC ........................ 713/300, 320, 321, 322, 323
See application file for complete search history.

(56) References Cited

U.S. PATENT DOCUMENTS

| | | | | |
|---|---|---|---|---|
| 6,055,641 A * | 4/2000 | Konaka et al. | ............... | 713/320 |
| 6,256,742 B1 * | 7/2001 | Konaka et al. | ............... | 713/320 |
| 6,742,130 B1 * | 5/2004 | Kawase | .......... | 713/300 |
| 6,816,977 B2 * | 11/2004 | Brakmo et al. | ............... | 713/323 |
| 6,993,680 B2 * | 1/2006 | Fukumori | ...................... | 714/14 |
| 7,120,559 B1 * | 10/2006 | Williams et al. | ............. | 702/185 |
| 7,302,600 B2 * | 11/2007 | Bibikar et al. | ................ | 713/324 |
| 7,360,107 B2 * | 4/2008 | Yuasa | ........................... | 713/340 |
| 7,379,846 B1 * | 5/2008 | Williams et al. | ............. | 702/185 |
| 7,469,351 B2 * | 12/2008 | Baba et al. | ..................... | 713/300 |
| 7,516,025 B1 * | 4/2009 | Williams et al. | ................ | 702/57 |
| 7,574,288 B2 * | 8/2009 | Kawase et al. | ................... | 701/1 |
| 7,840,824 B2 * | 11/2010 | Baba et al. | ..................... | 713/300 |
| 7,975,152 B2 * | 7/2011 | Norinobu | ...................... | 713/300 |
| 8,009,502 B2 * | 8/2011 | Johnston et al. | ............. | 365/229 |
| 2001/0021981 A1 * | 9/2001 | Konaka et al. | ................ | 713/300 |
| 2002/0032876 A1 * | 3/2002 | Okagaki et al. | .............. | 713/300 |
| 2005/0024905 A1 * | 2/2005 | Shiojima | ...................... | 363/110 |
| 2006/0242438 A1 * | 10/2006 | Baba et al. | ..................... | 713/300 |
| 2006/0287805 A1 * | 12/2006 | Enomoto et al. | ............. | 701/113 |
| 2007/0074053 A1 * | 3/2007 | Bulusu et al. | ................ | 713/300 |
| 2008/0016378 A1 * | 1/2008 | Norinobu | ...................... | 713/300 |
| 2009/0094467 A1 * | 4/2009 | Baba et al. | ..................... | 713/300 |

FOREIGN PATENT DOCUMENTS

JP        07-044982        2/1995

* cited by examiner

*Primary Examiner* — Idriss N Alrobaye
*Assistant Examiner* — Getente A Yimer
(74) *Attorney, Agent, or Firm* — Cowan, Liebowitz & Latman, P.C.

(57) ABSTRACT

Backup control means controls processing for backing up data in storage means. In a state in which the storage means is not being supplied with power from the main power supply, a backup power supply supplies power to the storage means in order that backup processing by the backup control means will be performed. A timer measures power-supply time, which is the length of time the backup power supply supplies a voltage equal to or greater than a rated voltage to the storage means in order that backup processing will be performed. Determination means determines whether the power-supply time counted by the timer is shorter than length of a reference backup time. Notification of result of backup processing is given by alert means in accordance with the result of the determination made by the determination means.

10 Claims, 9 Drawing Sheets

■THE BACKUP POWER SUPPLY HAS DETERIORATED.
CONTACT YOUR SERVICEMAN TO REPLACE THE BACKUP POWER SUPPLY.
 IF YOU DO NOT INTEND TO MAKE THE REPLACEMENT,
BE SURE TO SHUT OFF THE POWER SUPPLY OF THE APPARATUS
BY THE CORRECT METHOD. IF YOU HAVE NOT SHUT OFF
THE POWER SUPPLY BY THE CORRECT METHOD,
DATA MAY NOT BE WRITTEN TO THE HARD DISK PROPERLY.

DO YOU WISH TO CONTINUE USE WITHOUT REPLACING
THE BACK-UP POWER SUPPLY?

| YES | NO |

INFORMATION PROCESSING APPARATUS AND METHOD OF CONTROLLING POWER THEREOF

BACKGROUND OF THE INVENTION

1. Field of the Invention

The present invention relates to an information processing apparatus and to a method of controlling power of this apparatus.

2. Description of the Related Art

An apparatus in which data in storage means is backed up by a backup power supply is known in the art. For example, there is an apparatus equipped with a write cache in a case where the storage means utilizes a magnetic disk drive (referred to as an "HDD" below) or the like. The write-cache function is such that when a write command and write data have been received from the apparatus, the data is stored in a buffer memory temporarily, the completion of the command is sent back to the apparatus before the data is written and the actual writing of the data is performed thereafter. At the moment the data is sent to the buffer memory utilized as the cache while the write-cache function is being executed, end of data write to the HDD is recognized by the apparatus. However, the time it takes to write the data from the buffer memory to the magnetic disk is longer than the time it takes to write the data from the apparatus to the buffer memory. In actuality, therefore, the writing of data to the HDD does not end unless all of the data in the buffer memory is transferred to the magnetic disk.

Accordingly, in order to solve the problem of loss of data owing to inadvertent cut-off of the HDD power supply, a power failure or a power supply anomaly such as a drop in voltage due to a sudden large increase in load, a technique using a backup power supply as the backup power supply has been proposed (see the specification of Japanese Patent Application Laid-Open No. 7-44982). Specifically, this patent document proposes a method according to which the backup power supply is activated and data in a write cache is written to a magnetic disk medium in the event that a main power supply develops an anomaly.

However, the prior art described above does not take the lifetime of the backup power supply into consideration. When a device is used for a prolonged period of time or is used under high temperatures, the charging capacity of the backup power supply gradually declines, the length of time during which power can be supplied shortens and there is the possibility that the data in the write cache will no longer be capable of being backed up. Further, if the charging capacity is too small and backup time too short, there is the likelihood that supply of power will stop while the writing of the data in the write cache to the magnetic disk is in progress and that this will lead to a magnetic disk defect such as a defective sector.

SUMMARY OF THE INVENTION

The present invention enables a user to be alerted of the result of backup processing of storage means that is no longer being supplied with power from a main power supply.

According to one aspect of the present invention, there is provided an information processing apparatus comprising: a backup control unit configured to control processing for backing up data that has been stored in storage means; a backup power supply charged by a main power supply, the backup power supply supplying power to the storage means, in a state in which the storage means is not supplied with power from the main power supply, in order that backup processing by the backup control unit will be performed; a timer configured to count power-supply time, which is a length of time a voltage equal to or greater than a prescribed voltage for assuring operation of the storage means is supplied by the backup power supply in order that backup processing will be performed; a determination unit configured to determine whether the power-supply time counted by the timer is shorter than length of a reference backup time for assuring completion of the backup processing; and an alert unit configured to notify of result of the backup processing in accordance with result of the determination made by the determination unit.

According to another aspect of the present invention, there is provided a method of controlling power of an information processing apparatus having a backup control unit configured to control processing for backing up data that has been stored in storage means, and a backup power supply charged by a main power supply, the backup power supply supplying power to the storage means, in a state in which the storage means is not supplied with power from the main power supply, in order that backup processing by the backup control unit will be performed, the method comprising: counting power-supply time, which is a length of time a voltage equal to or greater than a prescribed voltage for assuring operation of the storage means is supplied by the backup power supply in order that backup processing will be performed; determining whether the power-supply time measured at the power-supply time counting step is shorter than length of a reference backup time for assuring completion of the backup processing; and notifying of result of the backup processing in accordance with result of the determination made at the determining step.

Further features of the present invention will become apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1:
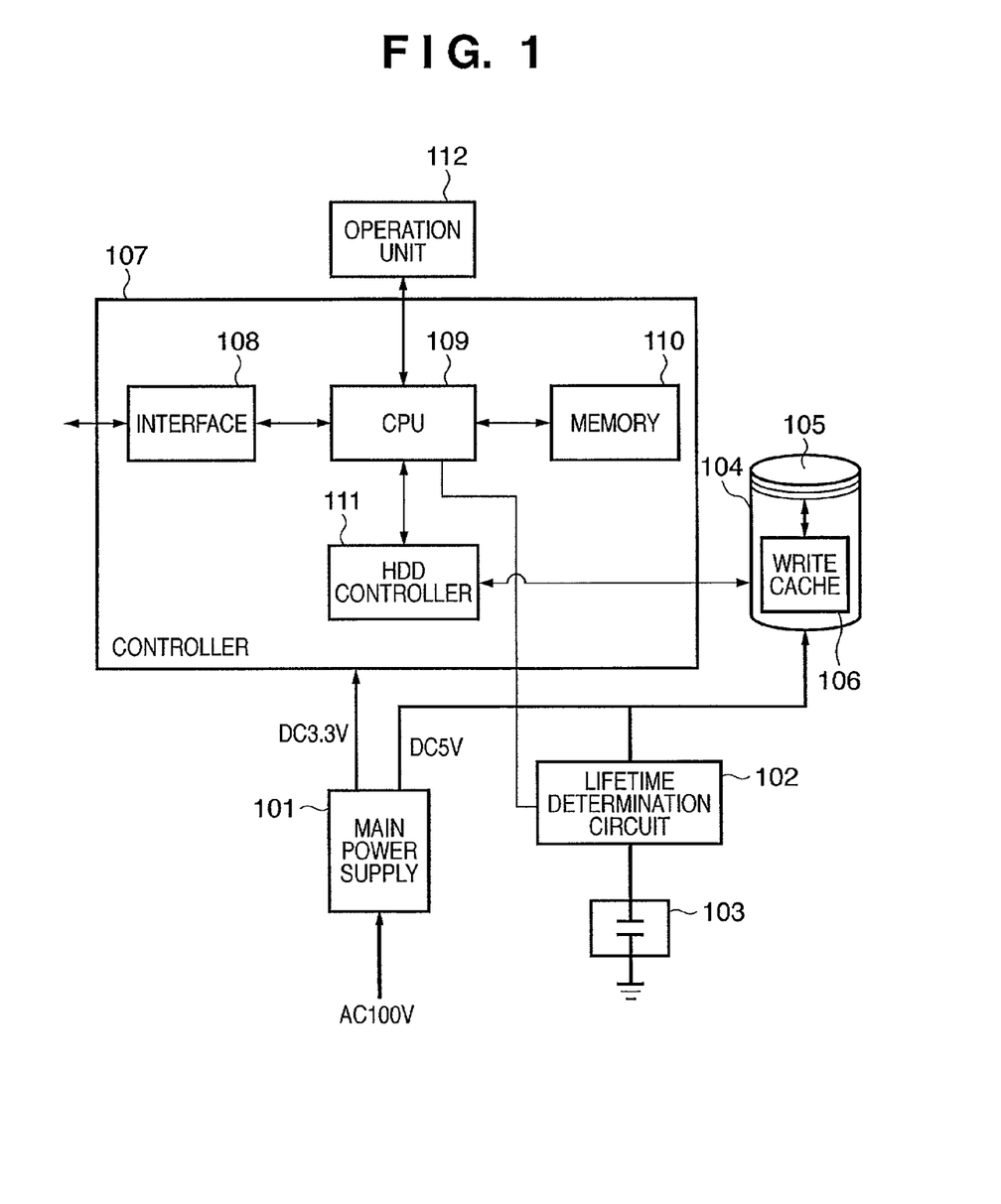
FIG. 1 is a block diagram illustrating a first embodiment of the present invention.

First, a control apparatus for controlling supply of power to an image forming apparatus such as a printer or copier will be described as a first embodiment of the present invention. FIG. 1 is a block diagram illustrating the configuration of the control apparatus according to the first embodiment of the present invention. It should be noted that although a power control method of controlling the supply of power to an image forming apparatus is described in this embodiment, the destination of the supply of power is not limited to an image forming apparatus and the present invention is applicable to all types of image processing apparatus that store data.

A main power supply (AC power supply) 101 converts externally supplied AC voltage (AC) to DC voltage (DC) and supplies this power supply voltage to the entirety of the image forming apparatus. Here DC 5V for an HDD 104 and DC 3.3V for a controller 107 are supplied from AC 100V. A backup power supply 103 serving as a backup power supply is a power supply charged by receiving supply of DC voltage from the main power supply 101. The backup power supply 103 comprises a large-capacity capacitor such as an electrical double-layer capacitor and is used primarily at occurrence of abnormality in the main power supply 101. A lifetime determination circuit 102 countss length of power-supply time, namely length of time during which an HDD 104 serving as storage means has been supplied with power from the backup power supply 103 serving as the backup power supply. Further, the lifetime determination circuit 102 determines whether the counted length of power-supply time is less than a reference backup time. If the counted length of power-supply time is less than the reference backup time, the lifetime determination circuit 102 judges that processing for backing up data, which has been stored in a write cache 106, to a magnetic disk 105 has not ended properly.

The HDD 104 serving as storage means is a 2.5-inch HDD and has the magnetic disk 105 serving as a non-volatile storage medium and the write cache 106 serving as a volatile storage medium. The controller 107 has a CPU 109 for controlling the overall image forming apparatus, and a memory 110 representing a RAM used for operation of the CPU 109 and a ROM, etc., in which the system booting program has been stored. The controller 107 further includes an HDD controller 111 serving as backup control means for controlling backup of data in the HDD 104; an interface 108 such as a LAN for communicating with external devices; and a operation unit 112 serving as a user interface (UI) for operating the image forming apparatus and displaying the status of the image forming apparatus. The operation unit 112 also functions as alerting means for alerting the operator of the image forming apparatus of the result of backup processing.

Figure 2:
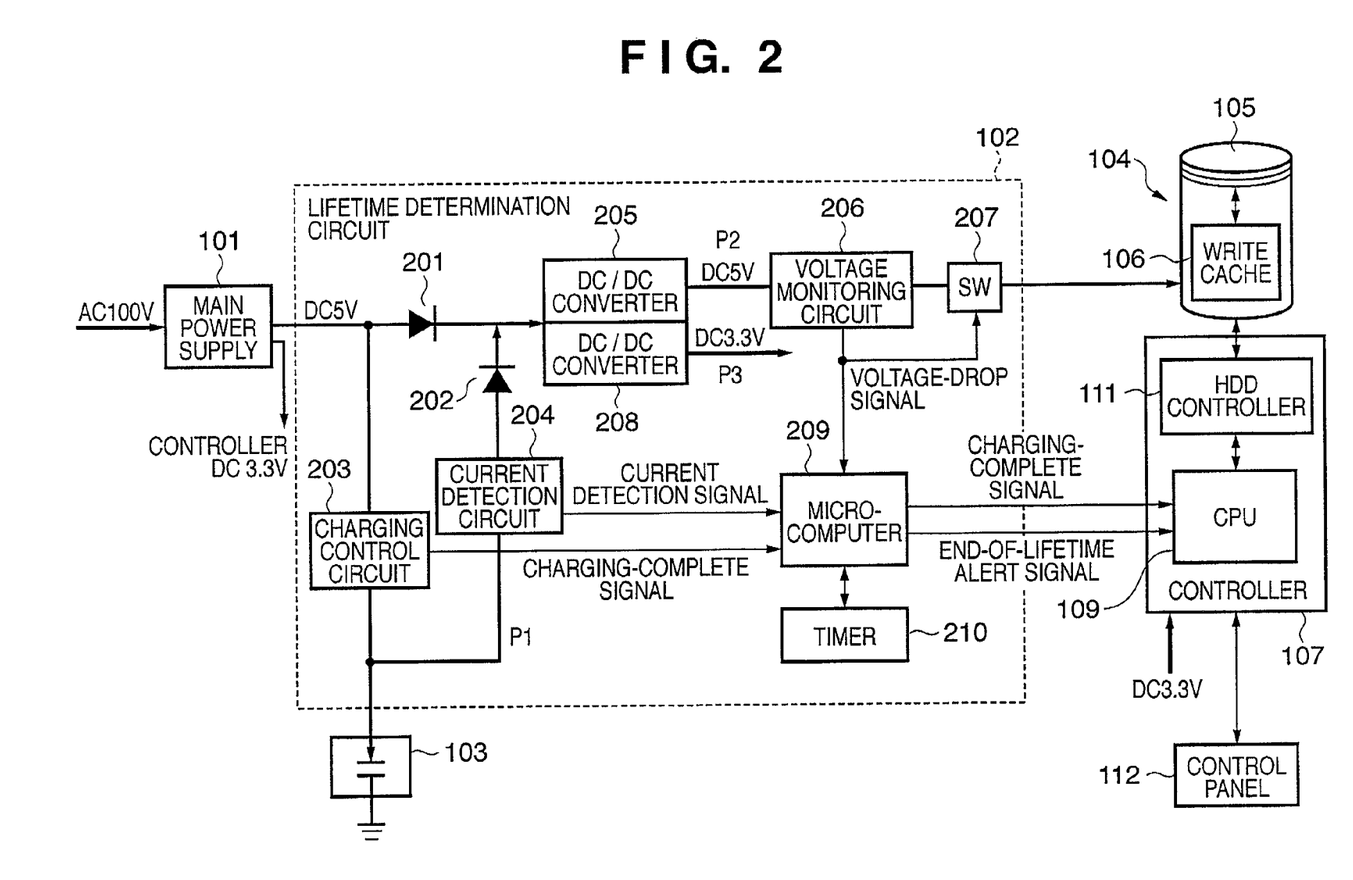
FIG. 2 is a block diagram illustrating the details of a lifetime determination circuit in FIG. 1.

FIG. 2 is a block diagram illustrating the details of the internal configuration of the lifetime determination circuit 102 shown in FIG. 1. The lifetime determination circuit 102 includes a DC/DC converter 205 for supplying the HDD 104 with DC 5V [P2 in FIG. 2], and a DC/DC converter 208 for supplying DC 3.3V [P3 in FIG. 2], which is the power supply of the lifetime determination circuit 102 itself. The lifetime determination circuit 102 further includes a diode (first reverse-current blocking diode) 201 connected between the main power supply 101 and DC/DC converter 205 in order to block reverse current in the power supply section, and a charging control circuit 203 for controlling the charging of the backup power supply 103, discriminating completion of charging and preventing power-supply reverse current. The lifetime determination circuit 102 further includes a current detection circuit 204 for detecting supply of power P1 from the backup power supply 103 to the HDD 104, and a diode (second reverse-current blocking diode) 202 connected between the current detection circuit 204 and DC/DC converter 205 in order to block reverse current in the backup section. The lifetime determination circuit 102 further includes a voltage monitoring circuit 206 for monitoring output voltage of the DC/DC converter 205; a switch 207 the switching of which is controlled by the voltage monitoring circuit 206; a timer 210 for measuring the length of time during which the HDD 104 is supplied with power from the backup power supply 103; and a microcomputer 209 for determining whether the backup power supply 103 has reached the end of its life based upon the length of power-supply time counted by the timer 210.

More specifically, the timer 210 functions as counting means for counting the length of time during which power is supplied to the HDD 104 serving as storage means in order that backup processing may be performed by the backup power supply 103 serving as the backup power supply. The microcomputer 209 functions as determination means for determining whether the length of power-supply time counted by the timer 210 serving as timekeeping means is shorter than a reference backup time. Via the CPU 109, the microcomputer 209 causes the operation unit 112, which serves as alert means, to notify the user of result of backup processing that accords with the result of determination as to whether the counted length of power-supply time is shorter than the reference backup time.

Figure 3:
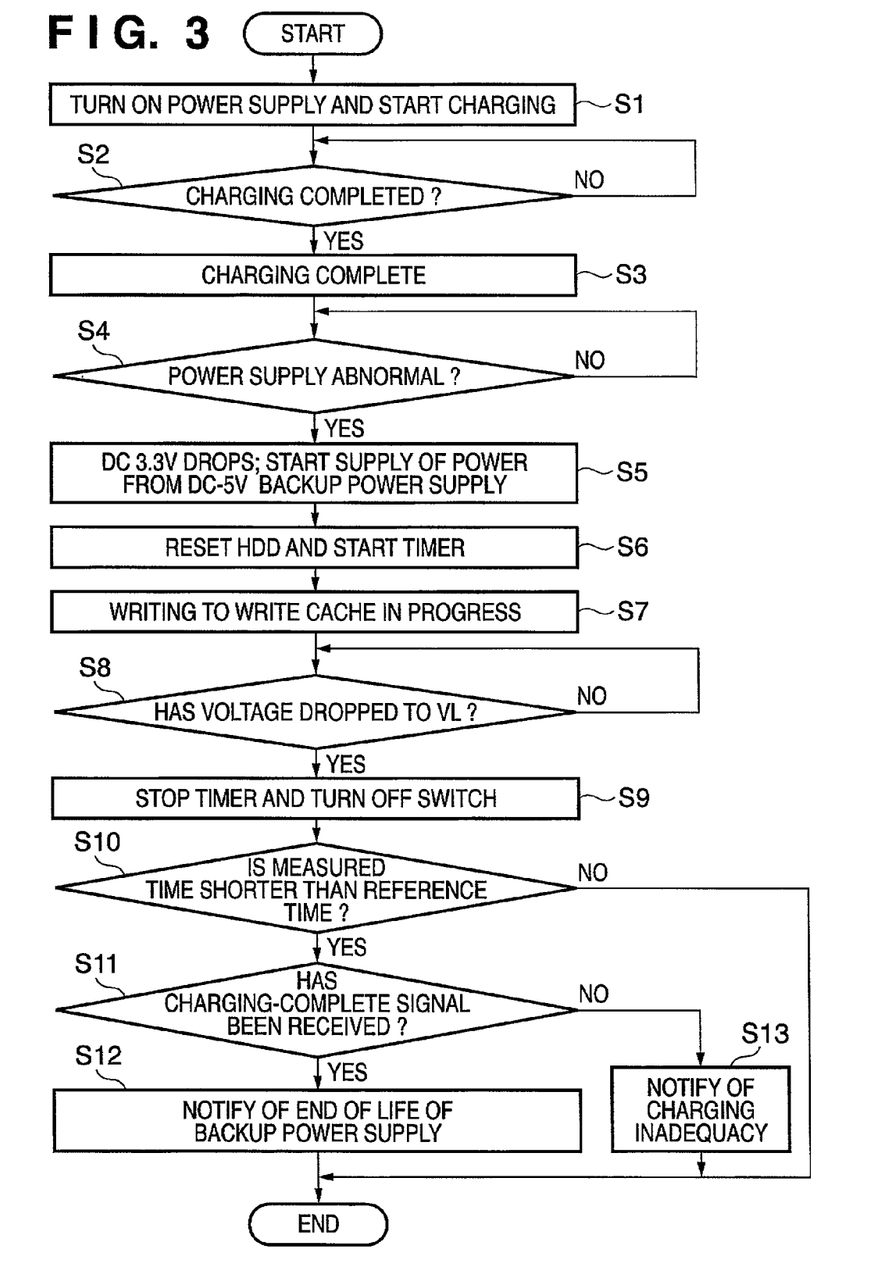
FIG. 3 is a flowchart for describing the operation of a magnetic disk control unit.

Reference will now be had to the flowchart of FIG. 3 to describe the power control operation of the lifetime determination circuit 102 illustrated in FIGS. 1 and 2. The step numbers are preceded by "S" in the description and drawings.

First, when the power supply of the image forming apparatus is turned on, the apparatus starts operating and the backup power supply 103 starts being charged (S1). In order to prevent a rush current from flowing into the backup power supply 103, the charging control circuit 203 controls the current that flows into the backup power supply 103. In this embodiment, rush current is limited simply by inserting a resistor. Next, at S2, completion of charging of the backup power supply 103 is monitored using the charging control circuit 203. The determination as to whether charging has been completed is made by monitoring the voltage of the backup power supply 103. That is, if the voltage of the backup power supply 103 reaches a predetermined maximum voltage, the charging control circuit 203 determines that charging has been completed and issues a charging-complete signal to the CPU 109 via the microcomputer 209. The means for detecting the change in voltage can employ any well-known technique.

When charging of the backup power supply 103 is completed (S3), the lifetime determination circuit 102 allows normal operation to continue as long as there is no interruption of the main power supply 101, a power failure or a power supply anomaly such as a drop in voltage due to a sudden large increase in load (S4). However, if the AC 100V that is applied to the main power supply 101 drops for some reason, then the supply of power from the main power supply 101 stops. At S5, therefore, the voltage of DC 3.3V supplied from the DC/DC converter 208 to the controller 107 starts falling. This is accompanied by the start of supply of power from the backup power supply 103 to the HDD 104 at S5.

Next, at S6, the HDD controller 111 resets the HDD 104 if the DC 3.3V supplied from the DC/DC converter 208 to the controller 107 falls below a certain voltage. Further, if the voltage of DC 5V supplied from the main power supply 101 to the HDD 104 falls, then this is accompanied by start of supply of power from the backup power supply 103 to the HDD 104 via the current detection circuit 204. At this time the current detection circuit 204 sends the current detection signal to the microcomputer 209 and the microcomputer 209 starts the timer 210. In other words, the timer 210 starts counting time at the moment the voltage (DC 5V) supplied from the main power supply 101 to the HDD 104 falls below the reference value.

Next, at S7, upon being reset from the HDD controller 111, the HDD 104 negates (ignores) all signals to and from the HDD controller 111 and terminates external communication. However, since data still remains in the write cache 106, the HDD 104 starts executing processing (backup processing) for writing the data, which has been stored in the write cache 106, to the magnetic disk 105. In other words, the HDD controller 111 functions as backup control means for sending a reset signal to the HDD 104, as a result of which backup processing of data in the HDD 104 is controlled.

Next, at S8, the voltage monitoring circuit 206 monitors the output voltage of the DC/DC converter 205. The HDD 104 can operate normally if the output voltage of the DC/DC converter 205 is equal to or greater than HDD rated voltage VL (=4.75V).

Figure 4:
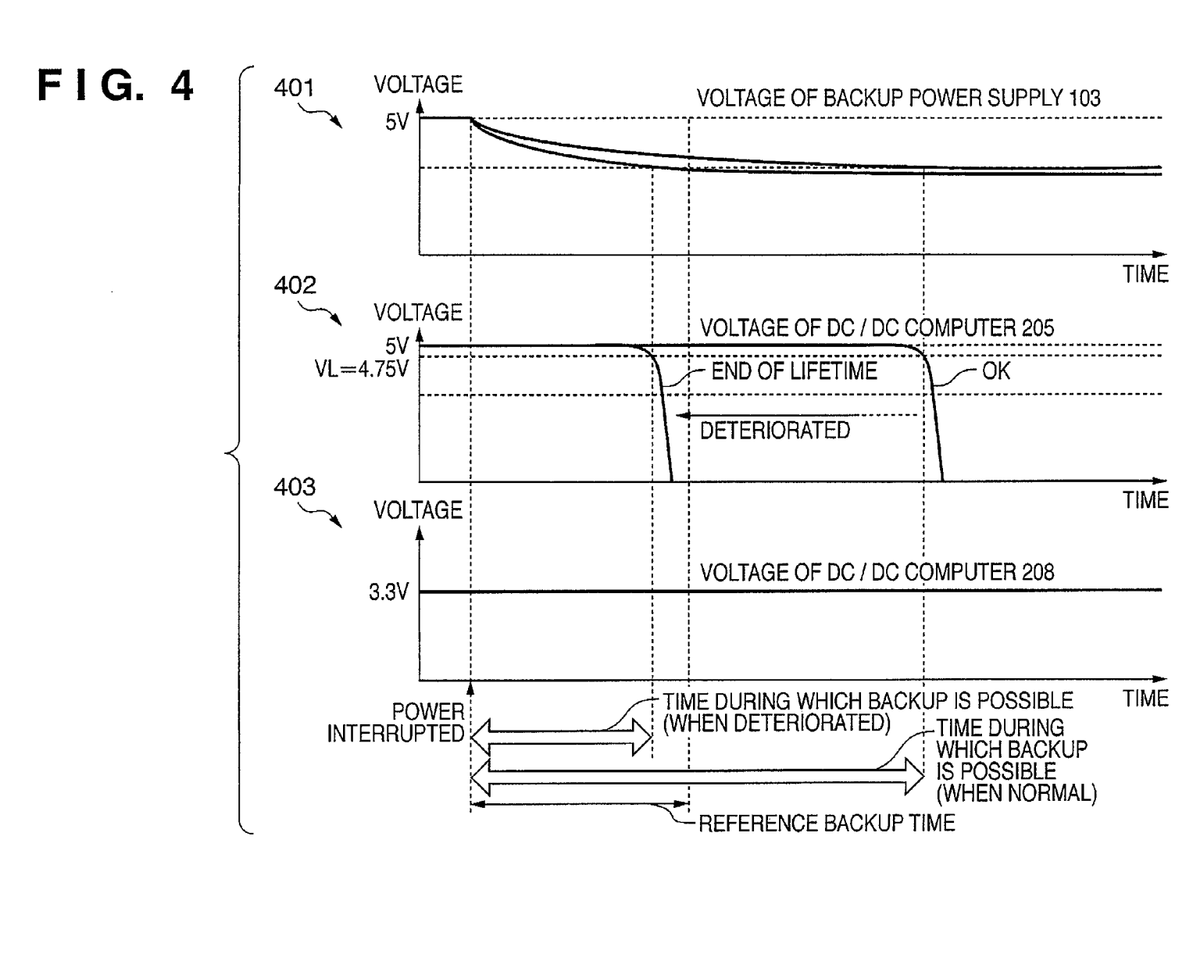
FIG. 4 is a diagram illustrating the relationship between discharge voltage of a backup power supply and output voltages of DC/DC converters.

Reference will be had to FIG. 4 to describe the relationship between the discharge voltage of the backup power supply 103 and the output voltages of the DC/DC converters 205, 208. Reference numerals 401, 402 and 403 represent discharge voltage of the backup power supply 103, output voltage of the DC/DC converter 205 that outputs DC 5V, and output voltage of the DC/DC converter 208 that outputs DC 3.3V, respectively. When supply of power from the main power supply (AC power supply) 101 is interrupted and supply of power from the backup power supply 103 to the HDD 104 begins, the discharge voltage of the backup power supply 103 starts to fall. If discharge to the HDD 104 continues, at a certain point the DC-5V DC/DC converter 205 can no longer maintain the voltage of 5V, which is the target value of the output voltage, and the output voltage starts to decline. At this time the DC-3.3V DC/DC converter 208 maintains the voltage of 3.3V, which is the target value of the output voltage. The reason for this is that the higher the output voltage and the greater the output current, the more difficult it is to hold the output steady. This is a general characteristic of a DC/DC converter. With regard to a comparison of current consumption of DC 5V and DC 3.3V, DC 5V is used in the power supply of the HDD and therefore consumed current is several hundred milliamps, whereas DC 3.3V is used mainly in supply of power to the microcomputer 209 and timer 210 and therefore the consumed current is several milliamps. Accordingly, it will be understood that it is more difficult to hold the output steady in the case of DC 5V in terms of consumed current as well.

The voltage from the backup power supply 103 continues to decline and falls below the rated voltage VL (=4.75V), which is the prescribed voltage that assures operation of the HDD 104, and hence operation of the HDD 104 can no longer be assured. When this occurs, the voltage monitoring circuit 206 that is monitoring the output voltage of the DC/DC converter 205 sends a voltage-drop signal to the microcomputer 209 and switch 207. It should be noted that when the backup power supply 103 deteriorates, the drop in voltage of the backup power supply 103 speeds up and this is accompanied by an earlier decline in the output voltage of the DC/DC converter 205, as illustrated in FIG. 4.

Upon receiving the voltage-drop signal, the microcomputer 209 advances processing from S8 to S9 and stops the timer 210. In other words, the timer counts length of power-supply time, which is the length of time during which a voltage equal to or greater than the prescribed voltage that assures the operation of the storage means is supplied. Further, the switch 207 is opened to halt the supply of power to the HDD 104. The switch 207 is opened to prevent unnecessary discharge and shorten charging time when charging is performed the next time; to shorten time in a transient state until the power supply of the HDD 104 is turned off; and to maintain the voltage value from the DC/DC converter 208 at 3.3V for a longer time.

As a result, at the moment the voltage supplied from the backup power supply 103 serving as the backup power supply to the HDD 104 serving as the storage means falls below the rated voltage (below the prescribed voltage) of the HDD 104, the supply of power from the backup power supply 103 to the HDD 104 is halted.

Figure 5:
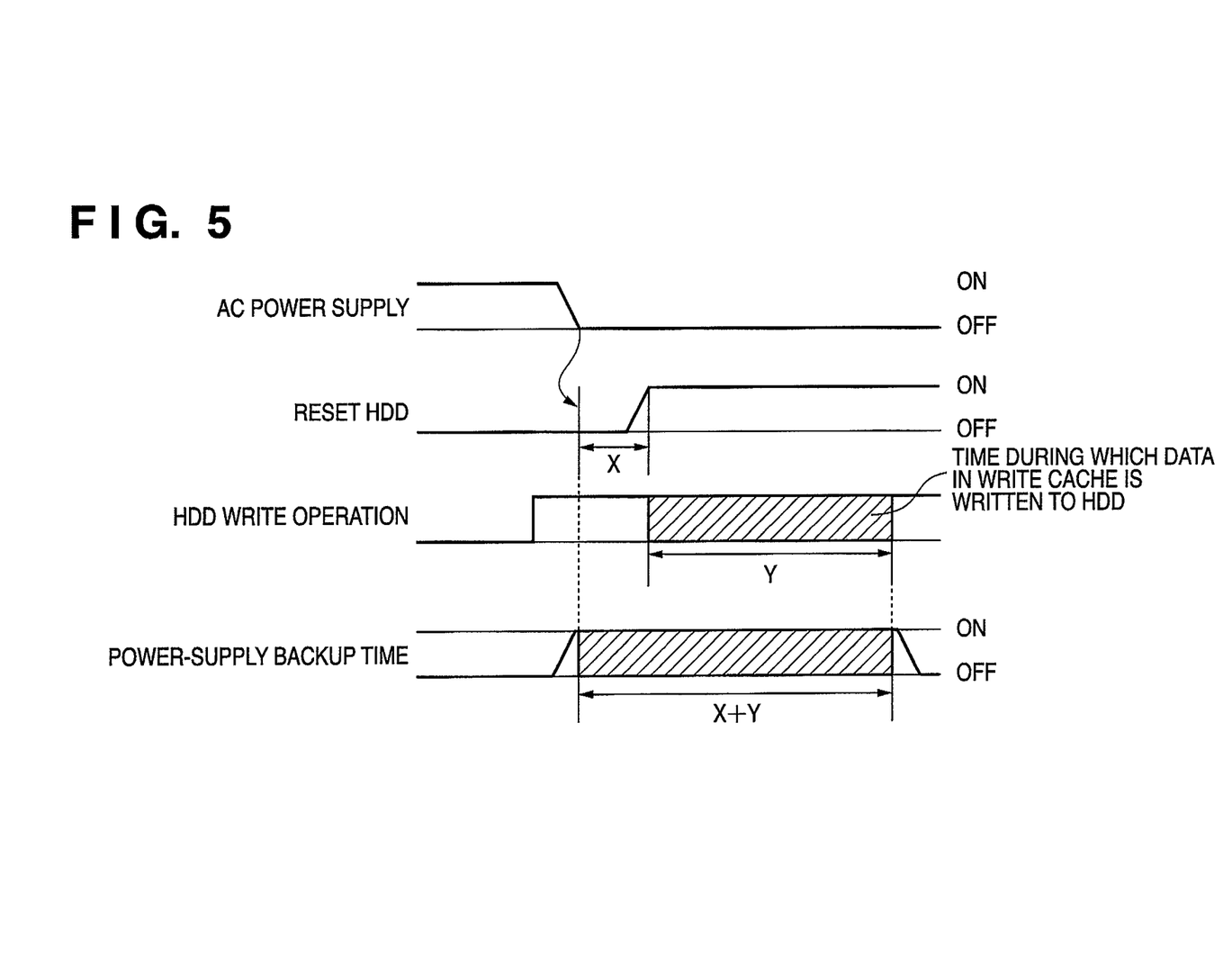
FIG. 5 is a diagram illustrating backup time.

Next, at S10, the microcomputer 209 compares the length of backup power-supply time counted by the timer and a preset reference backup time. Here the reference backup time (=shortest time necessary for backup) is a time obtained by adding a fixed margin time to the time period X+Y in FIG. 5. The reference backup time is a length of time that assures completion of backup processing for writing the data that has been stored in the write cache 106 to the magnetic disk 105. In other words, it is equivalent to a delay time X it takes for the reset signal to reach the HDD 104 after the supply of power from the main power supply 101 has been cut off, plus a time Y it takes to write the data that has been stored in the write cache 106 to the magnetic disk 105 after the HDD 104 has received the reset signal.

If the length of time it takes for DC 5V to actually be supplied from the backup power supply 103 to the HDD 104 is longer than the reference backup time ("NO" at S10), then a decision can be rendered to the effect that the writing of the data in the write cache 106 to the magnetic disk 105 has ended. In such case, therefore, processing is exited directly. Conversely, if the length of time it takes for DC 5V to actually be supplied from the backup power supply 103 to the HDD 104 is shorter than the reference backup time, then a decision can be rendered to the effect that backup processing has not ended properly. Processing then proceeds to S11.

Next, at S11, the microcomputer 209 determines whether it has received the charging-complete signal from the charging control circuit 203. Processing proceeds to step S12 if this signal has been received and to step S13 if the signal has not been received.

If the microcomputer 209 has received the charging-complete signal from the charging control circuit 203, then the microcomputer 209 determines that the backup power supply 103 has deteriorated and can no longer maintain enough power to write the data stored in the write cache 106 to the magnetic disk 105. Then, the next time the system is started up, the microcomputer 209 causes the CPU 109 to display an alert on operation unit 112. The alert indicates that the backup power supply 103 has reached the end of its life and prompts the user to replace it (S12).

If the charging-complete signal has not been received from the charging control circuit 203 even though the counted time is shorter than the reference backup time, then, at S13, the microcomputer 209 determines that charging is inadequate and does not send the end-of-lifetime alert signal to the CPU 109. In this case, the microcomputer 209 transmits a charging inadequacy signal indicating that the data that has been stored in the write cache 106 was not written to the magnetic disk 105 owing to insufficient charging. This signal is sent to the CPU 109, whereby the user is alerted of insufficient charging. It should be noted that the microcomputer 209 is not limited to the alerting method described at steps S12 and S13, and the alert may be issued by other methods so long as the alert indicates that data stored in the write cache 106 was not written to the magnetic disk 105.

In order that the microcomputer 209 may issue the end-of-lifetime alert signal and/or the charging inadequacy signal to the CPU 109 the next time the system is started up, it is required that the microcomputer 209 hold the end-of-lifetime alert signal and/or charging inadequacy signal until the next time the system is started up. Although the signals may be held as is by power supplied from the backup power supply 103 until the next time the system is started up, the lifetime determination circuit 102 may just as will be equipped with a non-volatile memory and the signals may be stored in this memory. Furthermore, the user may just as well be alerted as by a flashing red lamp when end of lifetime and/or insufficient charging is determined, without waiting for issuance of the end-of-lifetime alert signal and/or charging inadequacy signal until the next time the system is started up.

Figure 6:
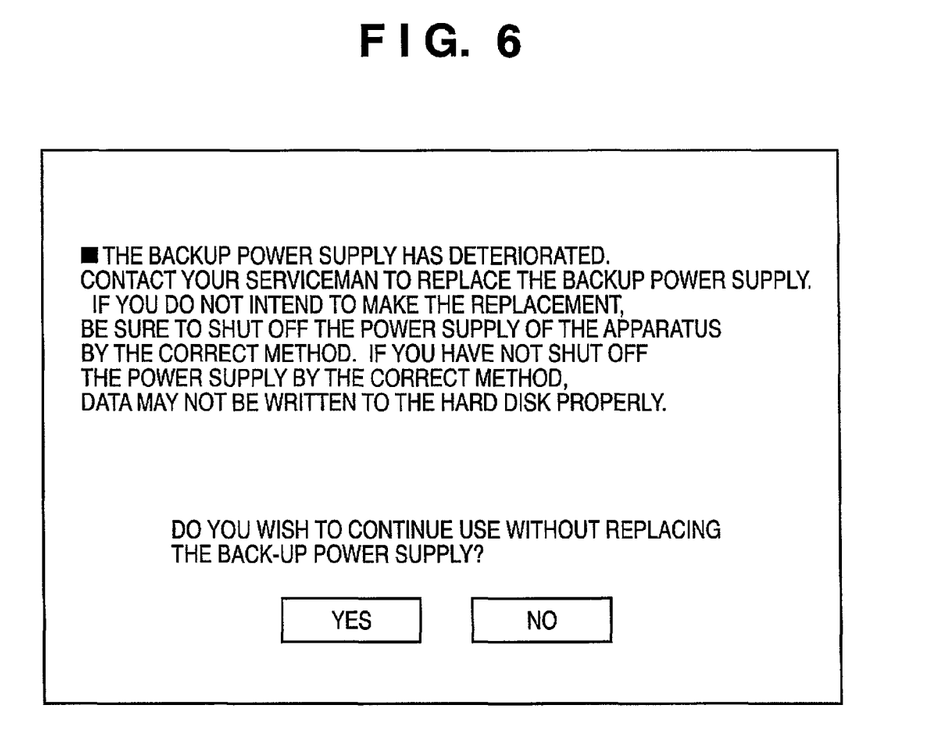
FIG. 6 is a diagram illustrating an example of an alert message.

Upon receiving the end-of-lifetime alert signal, the CPU 109 warns the user of end of lifetime of the backup power supply 103 via the operation unit 112 and prompts the user to replace the backup power supply 103 (S12), as illustrated in FIG. 6. Further, it may be so arranged that the backup power supply 103 will no longer operate. This is because there may be users who do not wish to replace the backup power supply 103 or users who wish to use the apparatus until replacement is made. In such case, as illustrated at the bottom of FIG. 6, the backup power supply 103 is cut off from the image forming apparatus after the user verifies whether or not the apparatus is to be used without replacing the backup power supply 103. The reason for this is that if a situation in which the writing of data from the write cache 106 to the magnetic disk 105 ends in incomplete fashion owing to the end of lifetime of the backup power supply 103 were to be allowed to continue, then the result would be a higher probability of occurrence of a defective sector. Such control can be implemented by inserting a switch at the position of the charging control circuit 203 and turning the switch off when the CPU 109 receives the end-of-lifetime alert signal.

Figure 7:
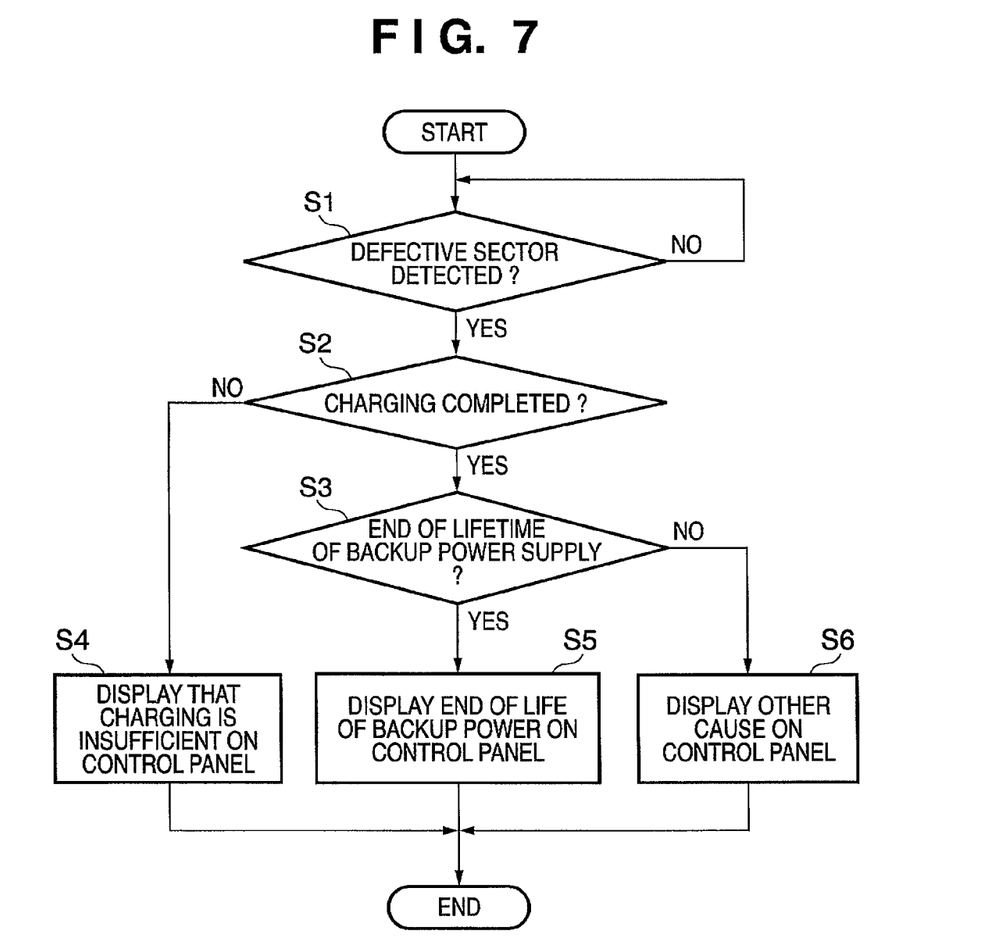
FIG. 7 is a flowchart for describing a method of determining the cause of a defective sector if a defective sector has occurred.

Next, reference will be had to the flowchart of FIG. 7 to describe a cause determination method in a case where a defective sector has occurred because the user continued to use a backup power supply for which end of lifetime was determined or because charging was inadequate. First, if occurrence of a defective sector is detected (S1) when the HDD 104 is accessed, the CPU 109 determines whether the charging-complete signal was issued from the charging control circuit 203 the last time the power supply was interrupted (S2).

If supply of power from the main power supply 101 was interrupted without the charging-complete signal being issued, there is a high likelihood that the power supply was interrupted in a state in which charging was insufficient. Accordingly, the CPU 109 causes the operation unit 112 to display the fact that the defective sector was the result of insufficient charging of the backup power supply 103 (S4). Next, if the charging-complete signal was issued and the defective sector occurred, then the CPU 109 checks to determine whether the microcomputer 209 issued the end-of-lifetime alert signal. If the end-of-lifetime alert signal was issued, this means that the backup power supply 103 has reached the end of its life and therefore this fact is displayed on the operation unit 112 (S5). Further, if the charging-complete signal was issued and the backup power supply 103 has not reached the end of its life, then the CPU 109 judges that the occurrence of the defective sector is due to some other cause and similarly displays this fact via the operation unit 112 (S6).

Figure 8:
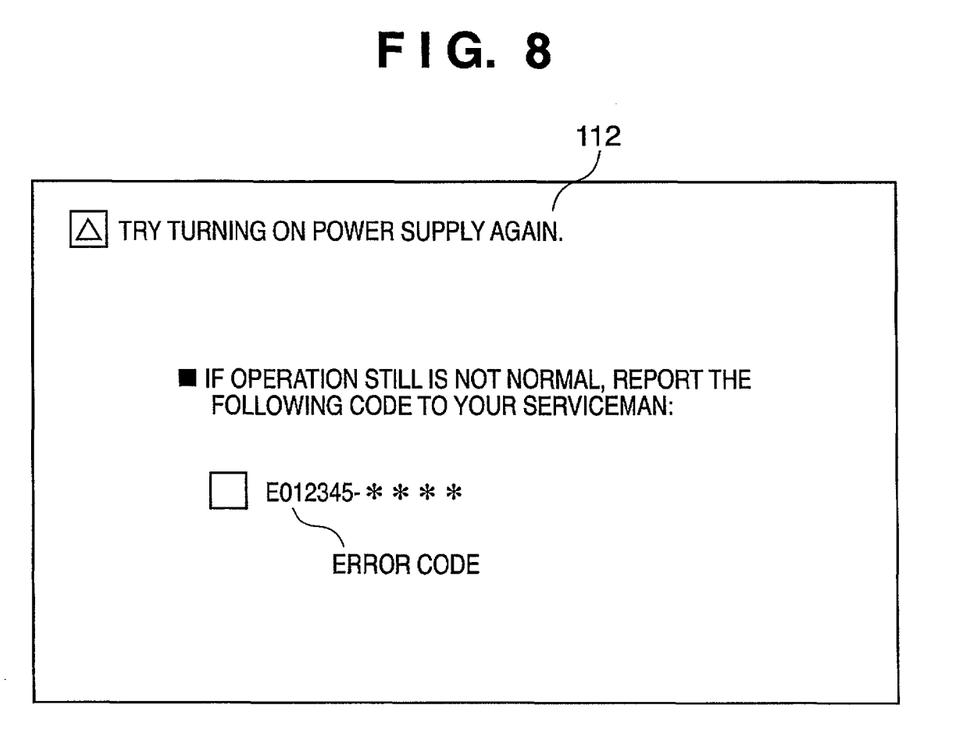
FIG. 8 is a diagram illustrating an example of an alert message.

Further, it is preferred that the display at this time be presented using an error-code display, as illustrated in FIG. 8. The error code is a unique code assigned to each individual error. A serviceman can identify the cause of the error by observing the error code.

Further, as for the timing at which the determination concerning the end of lifetime of the backup power supply is made, this may be whenever the AC power supply is interrupted or periodically at some other times. In order to make the end-of-lifetime determination, it is required that only the DC 5V being supplied from the main power supply to the HDD be cut off. When the apparatus is not being used, therefore, only the DC 5V is cut off and the end-of-lifetime determination can be made at any timing.

It should be noted that the reference time, which is for being compared with the length of time during which power is supplied from the backup power supply 103 to the HDD 104 in order to make the end-of-lifetime determination, may be changed in conformity with the amount of data stored temporarily in the write cache 106.

In accordance with the above-described embodiment, end of the lifetime of the backup power supply can be judged accurately. The user can be notified of result of processing for backing up storage means under a condition in which the storage means is not supplied with power from the main power supply. By operating the timekeeping circuit at a voltage lower than that of the storage device, length of time of backup by the backup power supply can be counted and it is possible to sense the end of lifetime of the backup power supply accurately. This enables a major improvement in reliability. Furthermore, in the event that a defective sector has occurred, it is possible to determine whether this is because charging of the backup power supply was inadequate, because the backup power supply reached the end of its life or because of some other cause.

(Second Embodiment)

Figure 9:
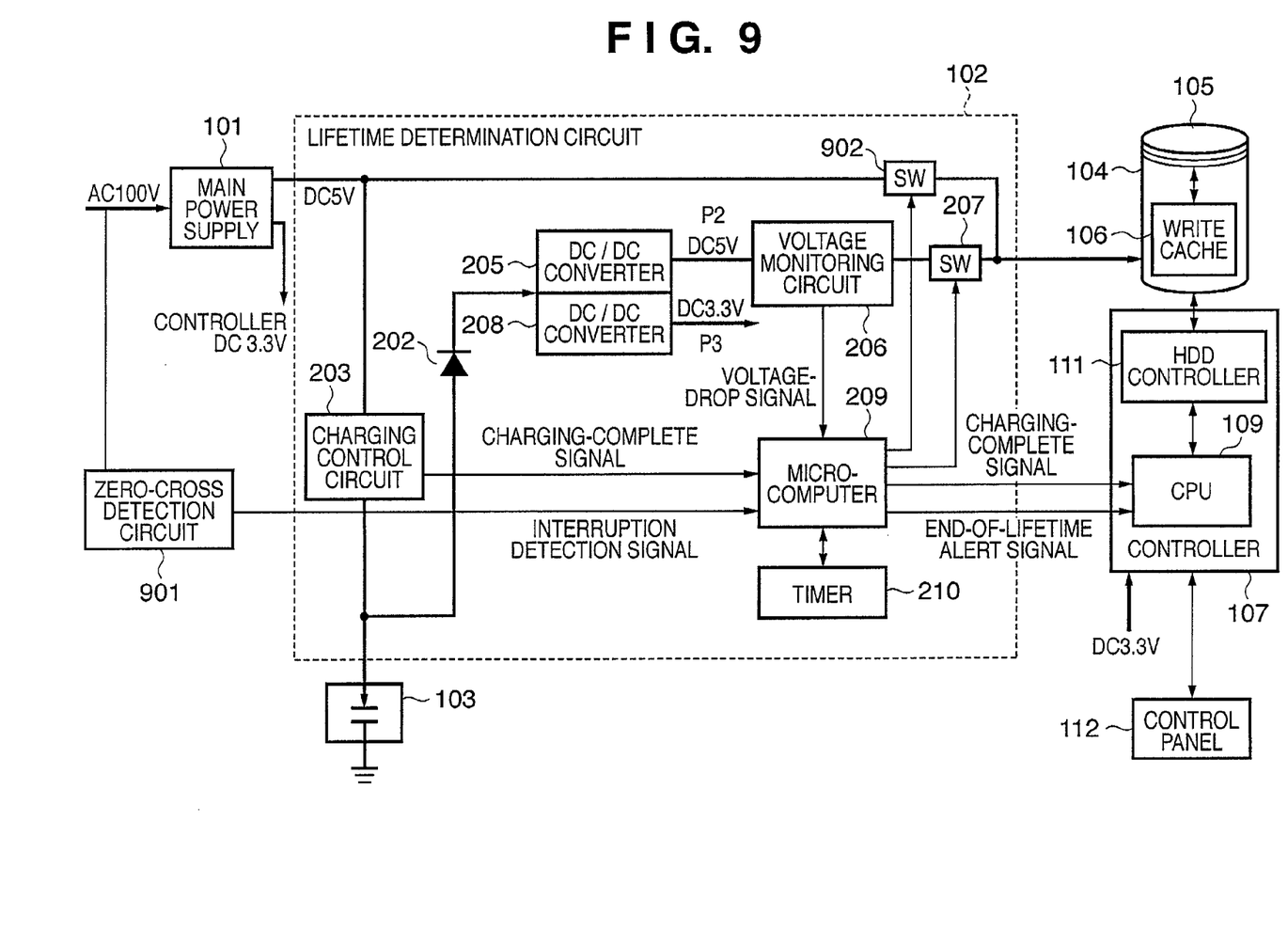
FIG. 9 is a block diagram illustrating a second embodiment of the present invention.

A second embodiment of the present invention will now be described with reference to the block diagram of FIG. 9. This embodiment differs from the first embodiment in terms of means for sensing interruption of the AC power supply and method of supplying power of DC 5V to the HDD.

The means for sensing interruption of the AC power supply will be described first. In the first embodiment, interruption of the AC power supply is detected and the timer 210 started in response to start of supply of power from the backup power supply 103 to the HDD 104. In the second embodiment, use is made of a zero-cross detection circuit 901 provided in the AC-100V supply. If AC input halts, the zero-cross detection circuit 901 outputs an interruption detection signal to the microcomputer 209 so that instantaneous interruption of power such as a power failure can be detected. The interruption detection signal is used as a trigger for starting the timer. As a result, the timer 210 starts counting the power-supply time at the moment external supply of power to the main power supply 101 is interrupted. It should be noted that the output voltage of DC 5V from the main power supply 101 may be monitored directly and the timer started at the moment a drop in this voltage is detected.

Next, the method of supplying DC 5V to the HDD 104 will be described. In the first embodiment, supply is via the DC/DC converter 205 in a case where power is supplied from the main power supply 101 to the HDD 104. As a consequence, power on the order of 10 to 20% is consumed needlessly, depending upon the efficiency of the DC/DC converter. Accordingly, in this embodiment, power is supplied directly from the main power supply 101 to the HDD 104. However, since a reverse current will be produced with the circuit as it is, the path from the main power supply to the HDD is provided with a switch 902, the path from the backup power supply to the HDD is provided with a switch 207 and these switches are controlled by the microcomputer 209. More specifically, when the power supply is on, the switch 902 is closed, the switch 207 is opened and power is supplied from the main power supply 101 to the HDD 104, during which time a reverse current to the backup power supply 103 is prevented. If interruption of the AC power supply is subsequently detected, switch 902 is opened and switch 207 closed in order to prevent a reverse current to the main power supply 101 while power is supplied from the backup power supply 103 to the HDD 104.

In the first embodiment, the switch 207 is opened by the voltage-drop signal that is output from the voltage monitoring circuit 206 following the end of backup. In the second embodiment, however, the switch 207 is opened when a prescribed backup time set in the microcomputer elapses.

As described above, this embodiment differs from the first embodiment in that use is made of the zero-cross detection circuit 901 for detecting interruption of the AC power supply, and in that the switch 902 is provided instead of using the DC/DC converter 205 to supply power to the HDD 104. However, the present invention is not limited to the first and second embodiments. The structural elements described in the first and second embodiments may be combined freely and the combination also falls within the scope of the present invention. Examples of combinations that can be used are an arrangement in which the zero-cross detection circuit 901 and the DC/DC converter 205 are used in the first embodiment and an arrangement in which the zero-cross detection circuit 901 is not used in the first embodiment but the switch 902 is used instead of the DC/DC converter 205.

In accordance with the foregoing embodiments, end of the lifetime of the backup power supply can be judged accurately. By operating the timekeeping circuit at a voltage lower than that of the storage device, length of time of backup by the backup power supply can be counted and it is possible to sense the end of lifetime of the backup power supply accurately. This enables a major improvement in reliability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-102130, filed on Apr. 9, 2007, which is hereby incorporated by reference herein in its entirety.

What is claimed is:

1. A storage apparatus comprising:
a storage device that includes a cache and storage unit, and stores data by writing data stored in the cache to the storage unit;
a main power supply that supplies a voltage to the storage device;
a backup power supply that supplies a voltage to the storage device in a state in which the storage device is not supplied with the voltage from the main power supply, when the voltage supplied from the main power supply fails below a reference voltage, greater than the prescribed voltage;
a detecting unit that detects a completion of charging the backup power supply;
a control unit that controls the storage device so as to execute a backup processing for writing the data stored in the cache to the storage unit in a state in which the storage device is not supplied with the voltage from the main power supply;
a timer that times a power-supply time being a duration of the voltage supply from the backup power supply to the storage device; and
a notification unit that notifies a user of prescribed information indicating that the backup power supply has deteriorated, in a case where the power-supply time timed by the timer is smaller than a reference time for the backup processing even when the detecting unit has detected the completion of charging the backup power supply, and, does not notify the user of the prescribed information in a case where the power-supply time timed by the timer is smaller than the reference time for the backup processing when the detecting unit has not detected the completion of charging the backup power supply.

2. The apparatus according to claim 1, wherein the cache is a volatile storage medium, and the storage unit is a non-volatile storage medium.

3. The apparatus according to claim 1, wherein the backup power supply is charged by the main power supply, and
the alert unit, when the power-supply time timed by the timer is smaller than the reference time, notifies of information indicating that the charging of the backup power supply is insufficient in a case where the detecting unit has not detected the completion of charging the backup power supply.

4. The apparatus according to claim 1, wherein the backup power supply is charged by the main power supply.

5. The apparatus according to claim 1, wherein the alert unit notifies of the prescribed information in response to supply the voltage from the main power supply to the storage device.

6. The apparatus according to claim 1, further comprising:
a monitoring unit that monitors the voltage supplied by the backup power supply; and
wherein the timer that times the power-supply time until the voltage monitored by the monitoring unit becomes a voltage lower than a prescribed voltage and a supply of the voltage from the backup power supply to the storage device is completed after starting the supply of the voltage from the backup power supply to the storage device.

7. A control method of controlling a storage apparatus comprising a storage device that includes a cache and storage unit, and stores data by writing data stored in the cache to the storage unit; a main power supply that supplies a voltage to the storage device; and a backup power supply that supplies a voltage to the storage device in a state in which the storage device is not supplied with the voltage from the main power supply; the method comprising:
detecting a completion of charging the backup power supply; controlling, in a control unit, the storage device so as to execute a backup processing for writing the data stored in the cache to the storage unit in a state in which the storage device is not supplied with the voltage from the main power supply, when the voltage supplied from the main power supply fails below a reference voltage , greater than the prescribed voltage;
timing a power-supply time being a duration of the voltage supply from the backup power supply to the storage device; and
notifying, in a notify unit, to a user of prescribed information indicating that the backup power supply has deteriorated, in a case where the power-supply time timed by the timer is smaller than a reference time for the backup processing even when the detecting unit has detected the completion of charging the backup power supply, wherein the alert unit does not notify the user of the prescribed information in a case where the power-supply time timed by the timer is smaller than the reference time for the backup processing when the detecting unit has not detected the completion of charging the backup power supply.

8. A storage control apparatus, which controls a storage device that includes a cache and storage unit, and stores data by writing data stored in the cache to the storage unit, comprising:
a main power supply that supplies a voltage to the storage device;
a backup power supply that supplies a voltage to the storage device in a state in which the storage device is not supplied with the voltage from the main power supply, when the voltage supplied from the main power supply fails below a reference voltage ,greater than the prescribed voltage:
a detecting unit that detects a completion of charging the backup power supply;
a control unit that controls the storage device so as to execute a backup processing for writing the data stored in the cache to the storage unit in a state in which the storage device is not supplied with the voltage from the main power supply;
a timer that times a power-supply time being a duration of the voltage supply from the backup power supply to the storage device; and
a notification unit that notifies to a user of prescribed information indicating that the backup power supply has deteriorated, in a case where the power-supply time timed by the timer is smaller than a reference time for the backup processing even when the detecting unit has detected the completion of charging the backup power supply, and does not notify the user of the prescribed information in a case where the power-supply time timed by the timer is smaller than the reference time for the backup processing when the detecting unit has not detected the completion of charging the backup power supply.

9. A storage apparatus comprising:
a storage device;
a main power supply that supplies a voltage to the storage device;
a backup power supply that supplies a voltage to the storage device in a state in which the storage device is not supplied with the voltage from the main power supply, when the voltage supplied from the main power supply fails below a reference voltage , greater than the prescribed voltage;
a detecting unit that detects a completion of charging the backup power supply;
a timer that times a power-supply time being a duration of the voltage supply from the backup power supply to the storage device; and
a notification unit that notifies to a user of prescribed information indicating that the backup power supply has deteriorated, in a case where the power-supply time timed by the timer is smaller than a reference time for the backup processing even when the detecting unit has detected the completion of charging the backup power supply, and does not notify to the user of the prescribed information in a case where the power-supply time timed by the timer is smaller than a reference time for the backup processing when the detecting unit has not detected the completion of charging the backup power supply.

10. A storage apparatus comprising:
a storage device that includes a cache and storage unit, and stores data by writing data stored in the cache to the storage unit;
a main power supply that supplies a voltage to the storage device;
a backup power supply that supplies a voltage to the storage device in a state in which the storage device is not supplied with the voltage from the main power supply, when the voltage supplied from the main power supply fails below a reference voltage , greater than the prescribed voltage;
a detecting unit that detects a completion of charging the backup power supply;
a control unit that controls the storage device so as to execute a backup processing for writing the data stored in the cache to the storage unit in a state in which the storage device is not supplied with the voltage from the main power supply;
a timer that times a power-supply time being a duration of the voltage supply from the backup power supply to the storage device; and
a notification unit that notifies a user of prescribed information prompting the user to replace the backup power supply, in a case where the power-supply time timed by the timer is smaller than a reference time for the backup processing even when the detecting unit has detected the completion of charging the backup power supply, and, does not notify the user of the prescribed information in a case where the power-supply time timed by the timer is smaller than the reference time for the backup processing when the detecting unit has not detected the completion of charging the backup power supply.

* * * * *